United States Patent [19]

Tezuka et al.

[11] Patent Number: 5,132,680
[45] Date of Patent: Jul. 21, 1992

[54] POLLING COMMUNICATION SYSTEM WITH PRIORITY CONTROL

[75] Inventors: Koji Tezuka; Tomohiro Shinomiya, both of Kawasaki; Shigeo Amemiya; Kazuo Iguchi, both of Yokohama; Tetsuo Soejima, Tama, all of Japan

[73] Assignee: Fujitsu Limited, Kawasaki, Japan

[21] Appl. No.: 447,432

[22] Filed: Dec. 7, 1989

[30] Foreign Application Priority Data

Dec. 9, 1988 [JP] Japan .................................. 63-310100

[51] Int. Cl.$^5$ ............................................. G05B 23/00
[52] U.S. Cl. ........................... 340/825.08; 340/825.07; 340/825.51; 370/85.8
[58] Field of Search ............ 340/825.08, 825.5, 825.07, 340/825.51, 505, 518; 370/85.8, 95.2, 104.1; 364/200, 900

[56] References Cited

U.S. PATENT DOCUMENTS

| 3,702,008 | 10/1972 | Groth | 370/85.8 |
| 4,500,989 | 2/1985 | Dahod | 370/85.8 |
| 4,595,921 | 6/1986 | Wang et al. | 340/825.08 |
| 4,742,512 | 5/1988 | Akashi et al. | 370/104.1 |
| 4,763,323 | 8/1988 | Nelson et al. | 340/825.5 |
| 4,924,461 | 5/1990 | Amemiya et al. | 370/85.8 |

FOREIGN PATENT DOCUMENTS

| 0116805 | 11/1979 | Japan | 340/825.08 |
| 0052949 | 5/1981 | Japan | 340/825.08 |
| 0168458 | 12/1981 | Japan | 340/825.08 |
| 60-74074 | 4/1985 | Japan . | |
| 61-94435 | 5/1986 | Japan . | |
| 61-278959 | 12/1986 | Japan . | |
| 0122437 | 6/1987 | Japan | 340/825.08 |
| 62-281635 | 12/1987 | Japan . | |
| PCT/US85/-01155 | 6/1985 | PCT Int'l Appl. . | |
| 2162722A | 7/1985 | United Kingdom . | |

Primary Examiner—Donald J. Yusko
Assistant Examiner—Peter S. Weissman
Attorney, Agent, or Firm—Staas & Halsey

[57] ABSTRACT

A communication system including a master station, a plurality of slave stations each for communicating with the master station, a two-way transmission line connecting the master station and the plurality of slave stations. Each of the slave stations sends a request for further communication with the master station, to the master station when its own slave station is allowed to communicate with the master station and its own slave station has the above request. The master station detects the request for further communication with the master station in a signal sent from a slave station, and memorizes the slave station from which the request for further communication with the master station is detected, until an allowance signal is sent to the slave station from the master station corresponding to the memorizing of the slave station. The master station has a cyclic address pointer which points to an address of a next one of the slave stations in a cyclic order when no slave station is memorized in the master station. The master station outputs the allowance signal to communicate with the master station to a slave station which is memorized in the master station or to a slave station the address of which is pointed to by the cyclic address pointer when no request is memorized in the master station.

16 Claims, 13 Drawing Sheets

| TENO | DATA |

| TENO | R | DATA |

POLLING COMMUNICATION SYSTEM WITH PRIORITY CONTROL

BACKGROUND OF THE INVENTION (1) Field of the Invention

The present invention relates to a communication system containing a master station and a plurality of slave stations wherein communication between the master station and the plurality of slave stations is carried out by polling.

(2) Description of the Related Art

In a conventional communication system containing a master station and a plurality of slave stations which are usually located so far from the master station that an unignorable (round trip) delay exists in signal transmission between each slave station and the master station, the master station gives equal allowance to communicate with the master station to each slave station in a simple cyclic order by polling.

FIG. 1 shows an arrangement of a communication system between a master station and a plurality of slave stations.

The master station A and a plurality of slave stations $B_1, B_2, \ldots B_{n-1}, B_n$ are connected by transmission lines 101 and 102 each for transmitting signals in directions from the master station A to each slave station and from each slave station to the master station, respectively.

In the above arrangement, the master station has a polling table as shown in FIG. 2, which points to the addresses of the slave stations in a cyclic order, and each address which is pointed to is renewed after each polling operation. The master station polls (gives an allowance to communicate with the master station) to equally to each slave station in a simple cyclic order using the polling table.

The cycle of the above polling is determined so that a communication with each slave station can be completed without interference with a communication with another slave station In the conventional communication system in the arrangement of FIG. 1, it is not considered whether or not each slave station has a request for communication with the master station, or how much data is requested to be transmitted between the master station and each slave station at the moment of polling.

Therefore, the polling is equally carried out for each slave station regardless of the status of requests as above. The efficiency of communications between the master station and the plurality of slave stations is low due to the polling of a slave station which does not have a request for communication with the master station, and a possible occurrence of waiting for an allowance of communication with the master station, in a slave station.

SUMMARY OF THE INVENTION

An object of the present invention is to provide a communication system between a master station and a plurality of slave stations, wherein communications are totally carried out with high efficiency.

Another object of the present invention is to provide a communication system between a master station and a plurality of slave stations, wherein exclusive use of the communication system by a slave station is prevented.

According to the first aspect of the present invention, there is provided a communication system containing: a master station, a plurality of slave stations each for communicating with the master station, a two-way transmission line connecting the above master station and the above plurality of slave stations. Each of the above slave stations including a request sending circuit for sending a request for further communication with the master station to the master station when its own slave station is allowed to communicate with the master station and its own slave station has the above request. The master station includes a request detecting circuit, a request memorizing circuit, a cyclic address pointer, and a select control circuit. The request detecting circuit detects a request for further communication with the master station in a signal sent from a slave station. The request memorizing circuit memorizes a slave station from which a request for further communication with the master station is detected, until an allowance is sent to the slave station from the master station corresponding to the memorizing of the slave station. The cyclic address pointer points out an address of a next one of the slave stations in a cyclic order when no slave station is memorized in the request memorizing circuit. The select control circuit outputs an allowance to communicate with the master station to a slave station which is read out from the request memorizing circuit when at least one slave station is memorized in the request memorizing circuit, or to a slave station the address of which is pointed out by the cyclic address pointer circuit when no request is memorized in the request memorizing circuit.

According to the second aspect of the present invention, there is provided a communication system containing: a master station, a plurality of slave stations each for communicating with the master station, a two-way transmission line connecting between the above master station and the above plurality of slave stations. Each of the slave stations including a request sending circuit for sending a request for further communication with the master station, to the master station when its own slave station is allowed to communicate with the master station and its own slave station has the above request. The master station includes a request detecting circuit, a request memorizing circuit, a counter circuit, a cyclic address pointing circuit, and a select control circuit. The request detecting circuit detects a request for further communication with the master station in a signal sent from a slave station. The request memorizing circuit memorizes a slave station from which a request for further communication with the master station is detected, until an allowance is sent to the slave station from the master station corresponding to the memorizing of the slave station. The counter circuit counts a number of successive outputs of allowances to communicate with the master station, which have been given to the slave stations which are memorized in the request memorizing circuit, and is reset when the number becomes equal to a predetermined number. The cyclic address pointer points out an address of a next one of the slave stations in a cyclic order when no slave station is memorized in the request memorizing circuit, or when the count in the counter circuit becomes equal to the predetermined number. The select control circuit outputs an allowance to communicate with the master station to a slave station which is read out from the request memorizing circuit when at least one slave station is memorized in the request memorizing circuit, and the count in the counter circuit is not equal to the predetermined number. Alternatively, select control circuit outputs an allowance to communicate with the master station to a slave station the address of which is pointed out by the cyclic address pointer circuit when no request is memorized in the request memorizing circuit, or when the count in the counter circuit is equal to the predetermined number.

DESCRIPTION OF THE PREFERRED EMBODIMENTS

Figure 3:
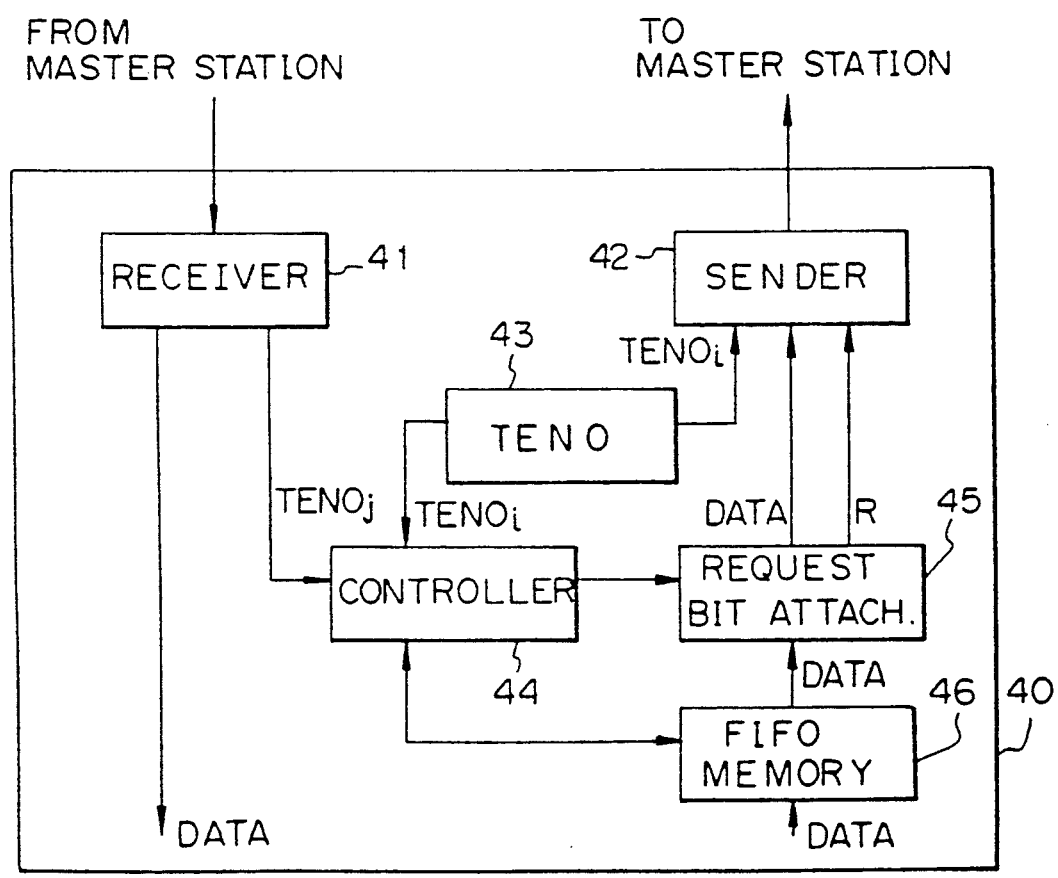
FIG. 3 is a block diagram of the construction of a slave station in the first embodiment of the present invention.
Figure 6:
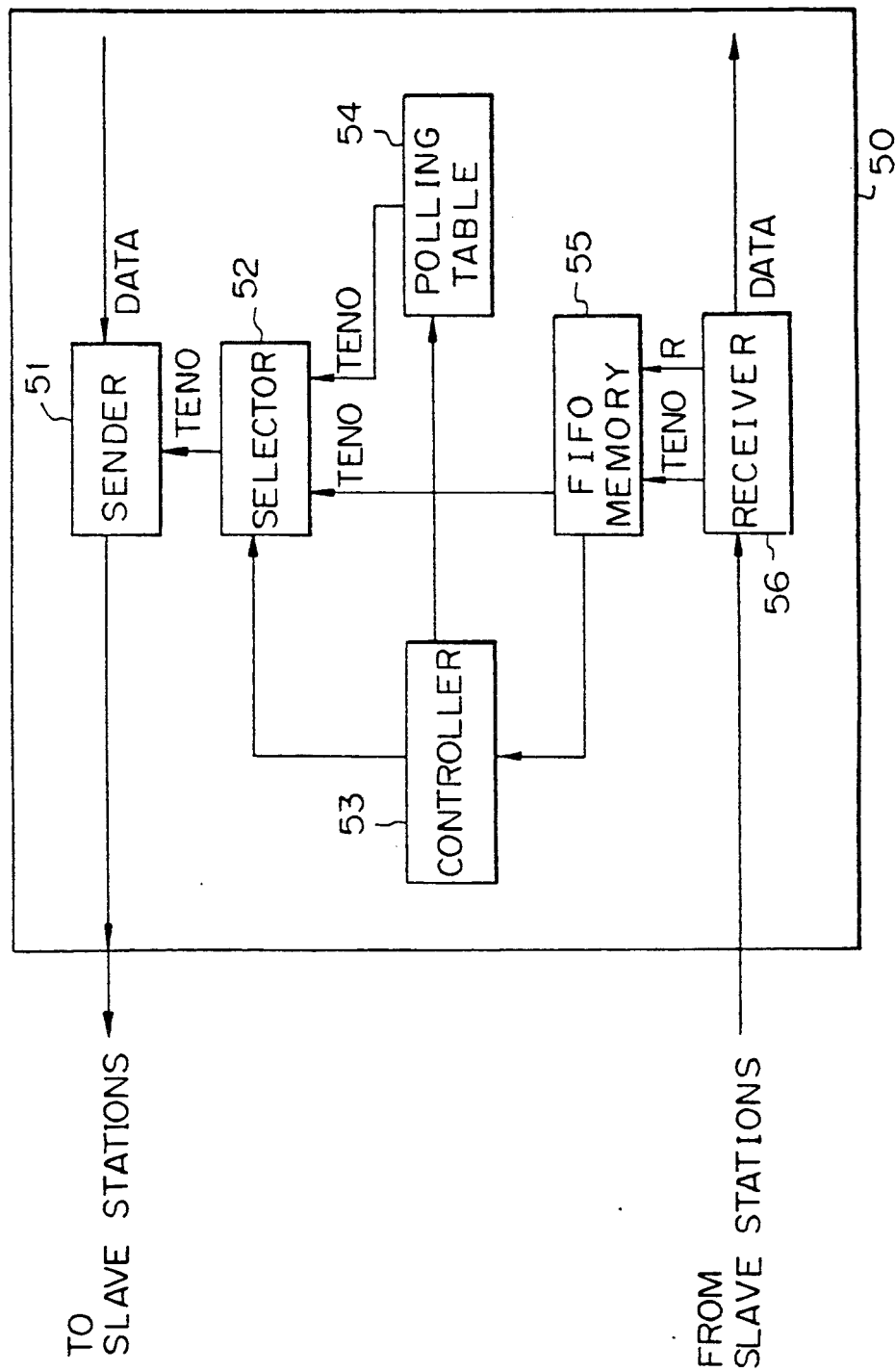
FIG. 6 is a block diagram of the construction of a master station in the first embodiment of the present invention.

FIG. 3 shows the construction of a slave station in the first embodiment of the present invention, and FIG. 6 shows the construction of a master station in the first embodiment of the present invention. The overall arrangement of the communication system is the same as the arrangement shown in FIG. 1.

In FIG. 3, reference numeral 40 denotes a slave station, 41 denotes a receiver circuit, 42 denotes a sender (transmitter) circuit, 43 denotes a register, 44 denotes a controller, 45 denotes a request bit attaching circuit, and 46 denotes a FIFO memory.

Figure 4A:
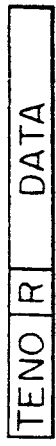
FIGS. 4A and 4B respectively show text formats of signals transmitted from the master station to the slave station, and from the slave station to the master station.

The receiver circuit 41 receives a polling signal from the master station (the construction and the operation of the master station is explained later). The text format of the polling signal from the master station to each slave station contains a terminal number TENO (an address of the slave station) to be polled, and data which is to be sent to the slave station, as shown in FIG. 4A.

When the receiver circuit 41 receives a polling signal, the receiver circuit 41 divides the content of the signal into a terminal number TENO portion and a data portion. The data portion is transferred to a portion wherein the data is processed (not shown), and the terminal number TENO portion is transferred to the controller 44.

The controller 44 compares the terminal number TENO portion in the received signal with the terminal number $TENO_i$ of its own slave station i, which is held in the register 43. The terminal number TENO portion includes a terminal number $TENO_j$ of the slave station j to be polled. Therefore, when an accord between the terminal number $TENO_j$ and the terminal number $TENO_i$ is detected, i.e., $i=j$, it is determined that its own slave station i is polled by (allowed to send data to) the master station.

When the above accord is not detected in the controller 44, no operation is carried out in response to the polling signal. However, when the above accord is detected in the controller 44, the controller 44 controls the FIFO memory 46 to output the oldest data held therein. The FIFO memory 46 holds data which is to be sent to the master station from the slave station. A predetermined amount of data which can be transmitted to the master station responding to one polling, i.e., a predetermined amount of data which can be transmitted to the master station in one cycle, is output when the FIFO memory 46 is controlled to output data by the controller 44 in a cycle, starting with the oldest data.

The amount of data output from the FIFO memory 46 is input into the request bit attaching circuit 45, where the request bit attaching circuit 45 is comprised of a register having a plurality of bits corresponding to the above input from the FIFO memory 46, and a request bit.

At the same time, the controller 44 determines whether or not the FIFO memory 46 holds a further amount of data to be sent to the master station, based on a signal indicating an amount of data held in the FIFO memory 46, which signal is generally output from a commercially available FIFO memory. When it is determined that an amount of data to be sent to the master station is held in the FIFO memory 46, the controller 44 sets the above request bit to "1". On the other hand when it is determined that no data to be sent to the master station is held in the FIFO memory 46, the controller 44 sets the above request bit to "0".

Then, the above amount of data which is input in the request bit attaching circuit 45, and the request bit are input in parallel into the sender circuit 42. At the same time, the content of the register 43, i.e., the terminal number $TENO_i$ of its own slave station i is input into the sender circuit 42.

Figure 4B:
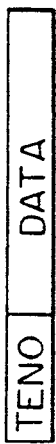

Using the above inputs, the sender circuit 42 makes a transmitting text format as shown in FIG. 4B, and sends the text to the master station through the transmission line 102.

Figure 5:
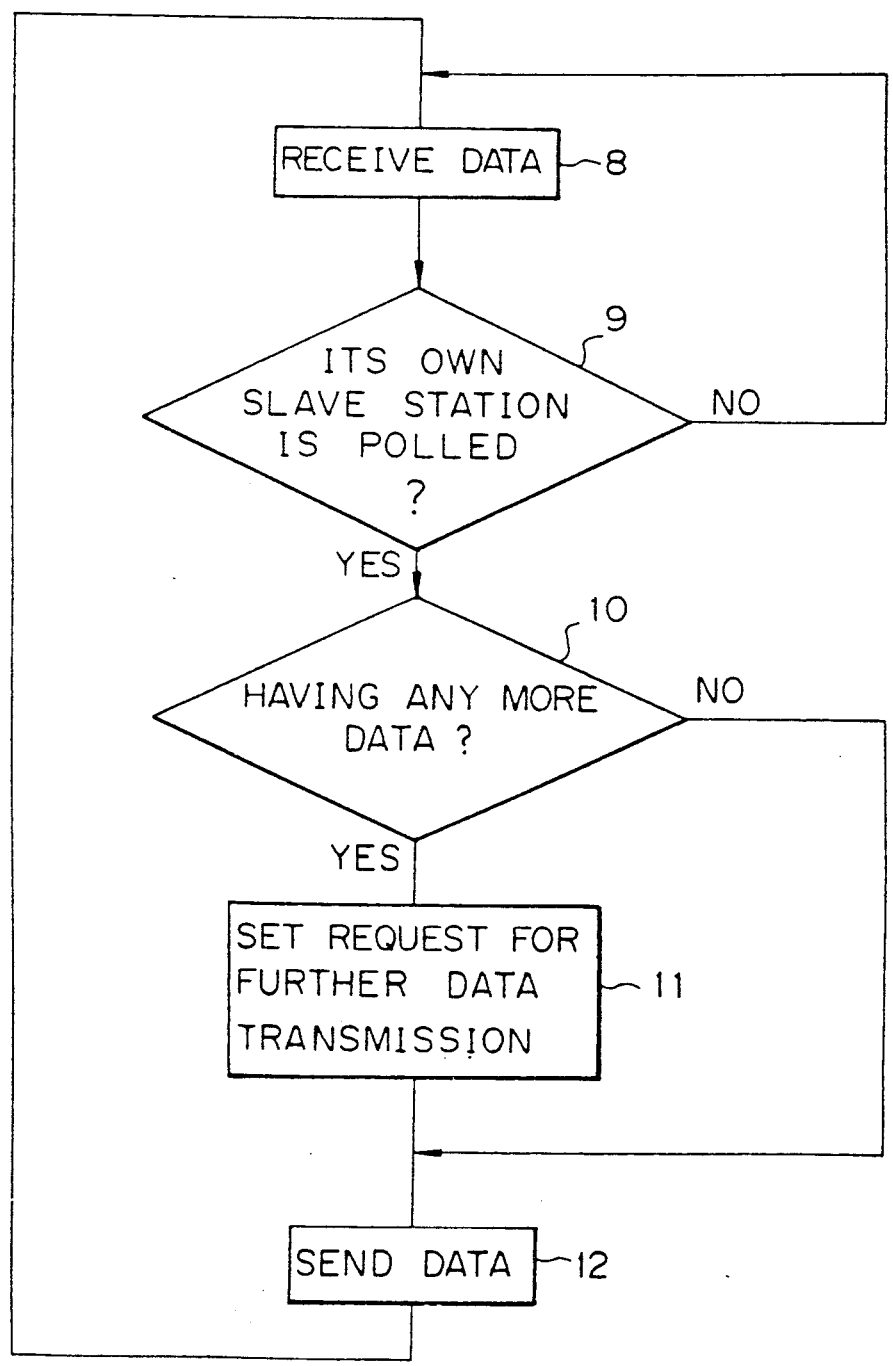
FIG. 5 is a flowchart illustrating an operation of the slave station shown in FIG. 3.

All the above operations in the slave station are controlled by the controller 44, and the control flow of the controller 44 is shown in FIG. 5.

When data (polling signal) is received in the step 8, it is determined whether or not its own slave station is polled in the step 9. If its own slave station is polled, it is determined whether or not its own slave station has further data which is to be sent to the master station (in addition to the data to be sent in the cycle responding to the polling determined in the step 9) in the step 10. If YES is determined in the step 10, a request to access the master station for a further data transmission is set in the step 11, and then transmission of the above data with the request is carried out from the slave station to the master station in the step 12.

If NO is determined in the step 10, transmission of the above data without the request is carried out from the slave station to the master station in the step 12.

In FIG. 6, reference numeral 50 denotes a master station, 51 denotes a sender (transmitter) circuit, 52 denotes a selector, 53 denotes a controller, 54 denotes a polling table, 55 denotes a FIFO memory, and 56 denotes a receiver circuit.

The receiver circuit 56 receives data from a slave station responding to a polling signal which has been sent to the slave stations from the master station a predetermined time beforehand. A polling signal is sent out each cycle to a slave station from the master station, and the master station receives a data signal for each cycle from the slave station to which the polling signal has been sent.

The text format of the polling signal from each slave station to the master station contains a terminal number TENO (an address of the slave station) which has been polled, a request bit, and data from the slave station, as shown in FIG. 4B.

When the receiver circuit 56 receives data, the receiver circuit 56 divides the content of the signal into a terminal number TENO, a request bit, and a data portion. The data portion is transferred to a portion of the master station wherein the data is processed (not shown), the terminal number TENO is applied to input terminals of the FIFO memory 55, and the corresponding request bit is applied to a control input terminal of the FIFO memory 55.

The applied data is input into the FIFO memory 55 when the request bit is "1", and the applied data is not input into the FIFO memory 55 when the request bit is "0".

The controller 53 monitors the amount of data held in the FIFO memory 55, and controls the FIFO memory 55 to read out (read and discard) the oldest terminal number TENO held in the FIFO memory 55 when it is determined that data is held in the FIFO memory 55, based on a signal indicating an amount of data held in the FIFO memory 55 as explained before with reference to FIG. 3.

The polling table 54 contains the terminal numbers of all the slave stations in the system, and one of the terminal numbers is pointed out. When it is determined that data is not held in the FIFO memory 55, the controller 53 controls the polling table 54 to point to a next terminal number TENO among the terminal numbers in the polling table 54 according to a predetermined cyclic order.

Both the outputs of the FIFO memory 55 and the polling table 54, are applied to the selector 52. The controller 53 controls the selector 52 to select the output of the the FIFO memory 55 when it is determined that data is held in the FIFO memory 55, and controls the selector 52 to select the output of the polling table 54 when it is determined that data is not held in the FIFO memory 55.

The terminal number TENO output from the selector 52 is input into the sender circuit 51 together with polling data which is to be sent to the slave station of the terminal number TENO. The sender circuit 51 makes a text format as shown in FIG. 4A containing the terminal number TENO and the data, and sends the text to the slave stations through the transmission line 101.

Figure 7:
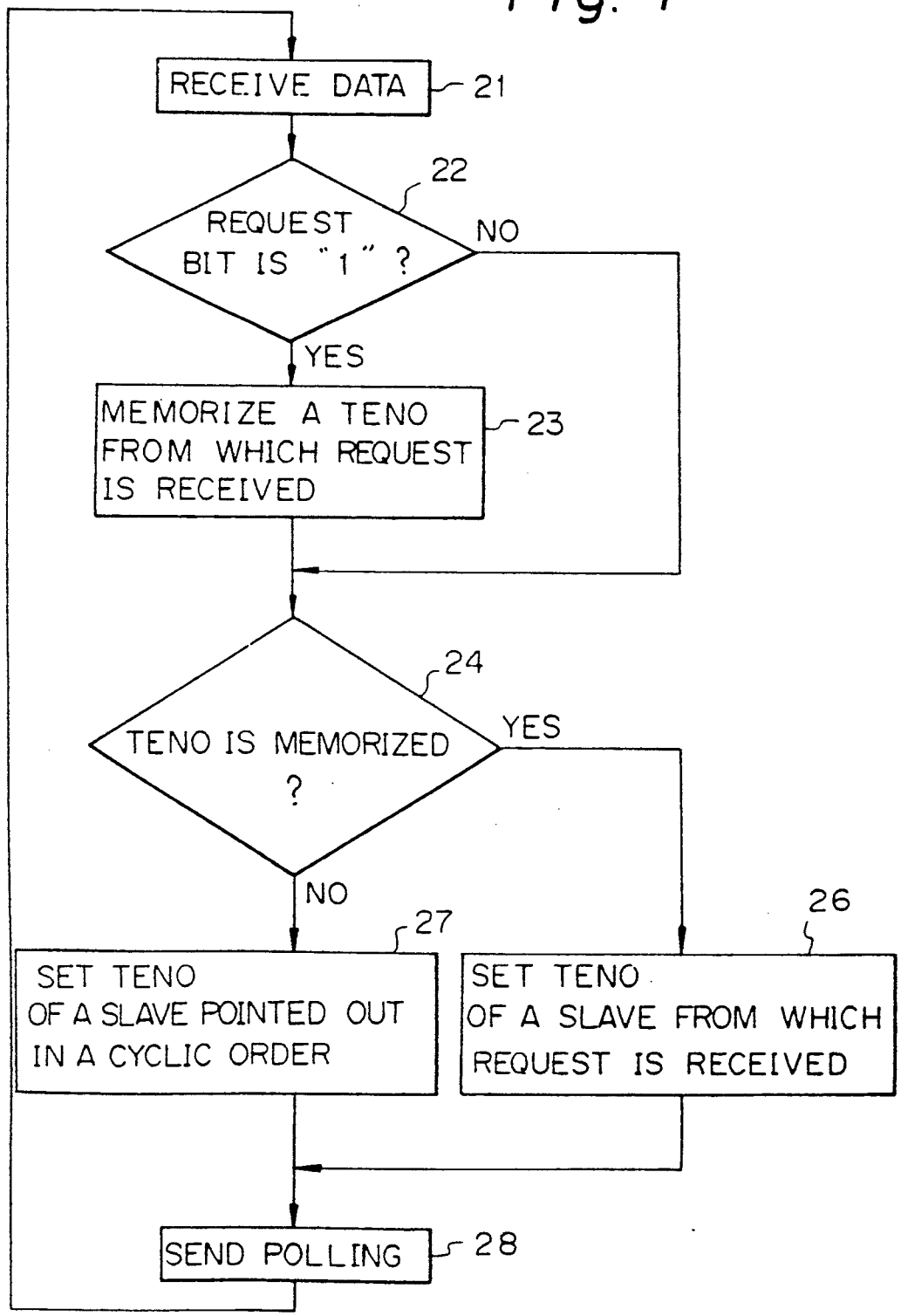
FIG. 7 is a flowchart illustrating operation of the master station shown in FIG. 6.

All the above operations in the master station are controlled by the controller 53, and the control flow of the controller 53 is shown in FIG. 7.

When data signal is received in the step 21, it is determined whether or not the request bit contained in the data signal is "1", in the step 22. If it is determined that the request bit is "1", the terminal number TENO corresponding to the request bit is input into the FIFO memory 55 in the step 23, or if it is determined that the request bit is "0", the terminal number TENO corresponding to the request bit is not input into the FIFO memory 55.

In the step 24, it is determined whether or not a terminal number TENO is memorized in the FIFO memory 55. If it is determined that a terminal number TENO is memorized in the FIFO memory 55, a terminal number TENO corresponding to the request bit is set for polling in the step 26, or if it is determined that a terminal number TENO is not memorized in the FIFO memory 55, a terminal number TENO which is pointed to in the polling table 54 is set for polling in the step 27. The polling signal containing the terminal number TENO is then sent to the slave stations in the step 28.

Figure 8:
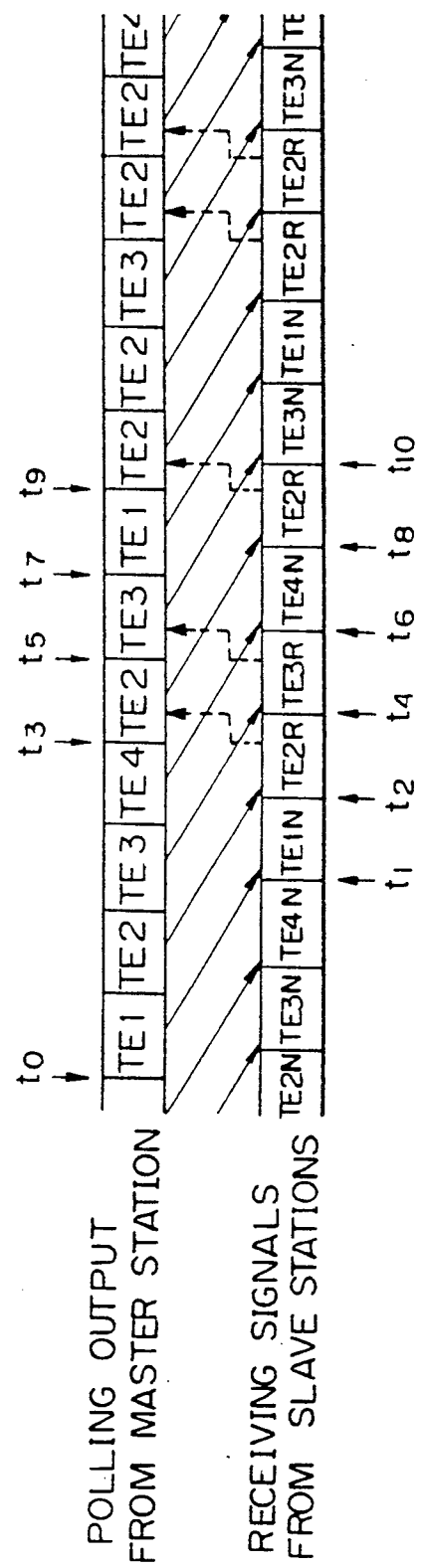
FIG. 8 is a timing chart illustrating an example of a timing of polling from the master station and signals received from the slave stations responding to the polling.

FIG. 8 shows an example of the timing of polling from the master station and signals received from the slave stations responding to the polling in the case where the number of the slave stations is four.

In FIG. 8, TE1, TE2, TE3, and TE4 respectively denote polling signals from the master station to the slave stations $B_1$, $B_2$, $B_3$, and $B_4$, TE1R, TE2R, TE3R, and TE4R respectively denote data signals sent from the slave stations $B_1$, $B_2$, $B_3$, and $B_4$ to the master station responding to the polling signals from the master station with a request bit "1", and TE1N, TE2N, TE3N, and TE4N respectively denote data signals sent from the slave stations $B_1$, $B_2$, $B_3$, and $B_4$ to the master station responding to the polling signals from the master station with a request bit "0".

From the time $t_0$ to $t_3$, polling signals TE1, TE2, TE3, and TE4 respectively containing terminal numbers of the slave stations $B_1$, $B_2$, $B_3$, and $B_4$, are output according to the polling table 54 because no request is received until the time $t_2$. The data signals responding to the above polling signals from the time $t_0$ to $t_3$, are received after a round trip delay from the time $t_1$ to $t_8$.

Requests for sending further data are included in the signals TE2R and TE3R, which are respectively received in the time $t_2$ from the slave station $B_2$, and in the time $t_4$ from the slave station $B_3$. Upon detecting the above requests, polling signals to the slave station $B_2$ and to the slave station $B_3$ are respectively sent out from the master station in the times $t_3$ and $t_5$.

In the time $t_7$, a polling signal TE1 containing a terminal number TENO1, which is pointed to in the polling table 54 after the above terminal number TENO4 in the cyclic order $B_1$, $B_2$, $B_3$, $B_4$, because the data signal received from the slave station $B_4$ in the time $t_6$ does not contain a request for sending further data.

A request for sending further data is included in the signal TE2R, which is received in the time $t_8$ from the slave station $B_2$. Detecting the request, a polling signal to the slave station $B_2$ is sent out from the master station in the time $t_9$.

Figure 9:
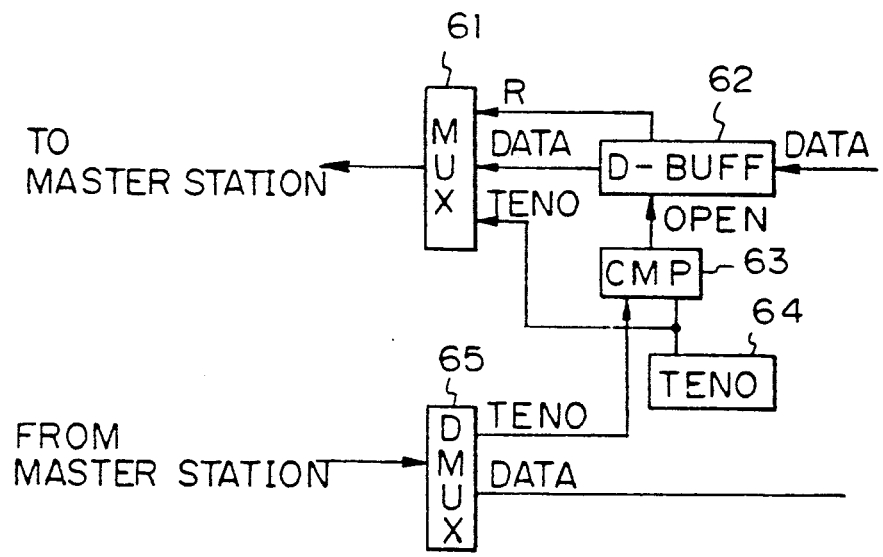
FIGS. 9 and 10 are block diagrams illustrating examples of realizations of the slave station and the master station of the first embodiment of the present invention.

FIG. 9 shows an example of realization of the slave station of the first embodiment of the present invention.

In FIG. 9, reference numeral 61 denotes a multiplexer, 62 denotes a data buffer, 63 denotes a comparator, 64 denotes a register, and 65 denotes a demultiplexer.

In the construction of FIG. 9, a polling signal of the format of FIG. 4A from the master station is divided into a terminal number TENO portion and data portion in the demultiplexer 65. The register 64 holds the terminal number of its own slave station. The terminal number TENO output from the demultiplexer 65 is compared with the terminal number held in the register 64 in the comparator 63.

The data buffer 62 functions as a FIFO memory, and outputs, when it is so controlled, an oldest amount of data held in the data buffer 62. The data buffer 62 has an output R which indicates whether or not further data is held in the data buffer 62.

When an accord between the terminal number TENO output from the demultiplexer 65 and the terminal number held in the register 64, is detected in the comparator 63, the oldest amount of data held in the data buffer 62 is output.

The above output R (which corresponds to the aforementioned request bit), the data output from the data buffer 62, and the terminal number from the register 64 are input in parallel in the multiplexer 61 to form the text format as shown in FIG. 4B, and the multiplexed signal is sent to the master station.

Figure 10:
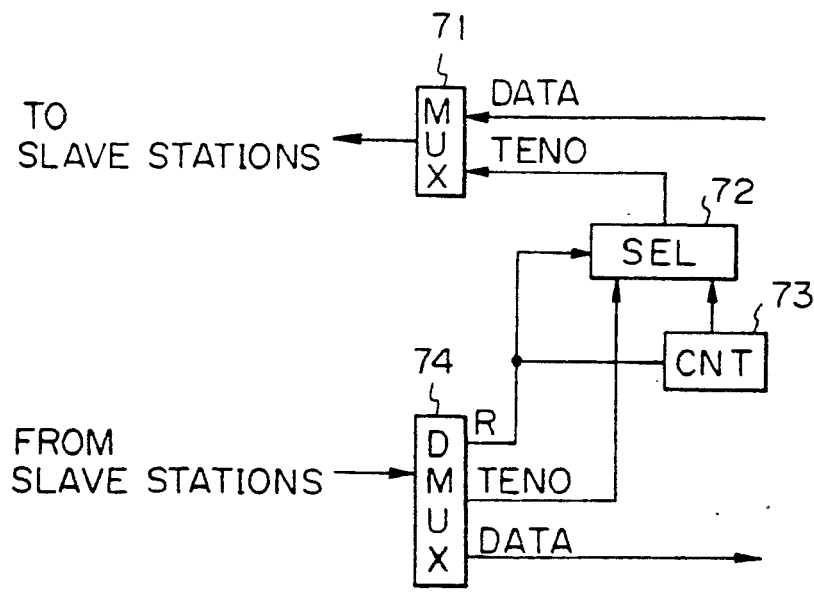

FIG. 10 shows an example of realization of the master station of the first embodiment of the present invention.

In FIG. 10, reference numeral 71 denotes a multiplexer, 72 denotes a selector, 73 denotes a counter, and 74 denotes a demultiplexer.

In the construction of FIG. 10, a data signal of the format of FIG. 4B from a slave station is divided into a request bit R, a terminal number TENO of the slave station, and data portion in the demultiplexer 74.

The counter 73 outputs a terminal number of a slave station, and the count is incremented when a signal in "0" state is input into the control terminal of the counter. The request bit R output from the demultiplexer 74 is applied to the control terminal of the counter 73, and therefore, the count of the counter 73, i.e., the terminal number TENO, is renewed when the request bit is "0".

The terminal number output from the demultiplexer 74 and the terminal number output from the counter 73 are applied to the selector 72, and the request bit R output from the demultiplexer 74 is applied to the selector as a control signal. The selector 72 selects the terminal number output from the demultiplexer 74 when the request bit is "1", or the selector 72 selects the terminal number output from the counter 73 when the request bit is "0".

The terminal number output from the selector 72 is input into the multiplexer 71 in parallel with data for polling. There the terminal number and the data for polling, are multiplexed to form the text format of FIG. 4A, and are sent to the slave stations.

Figure 1:
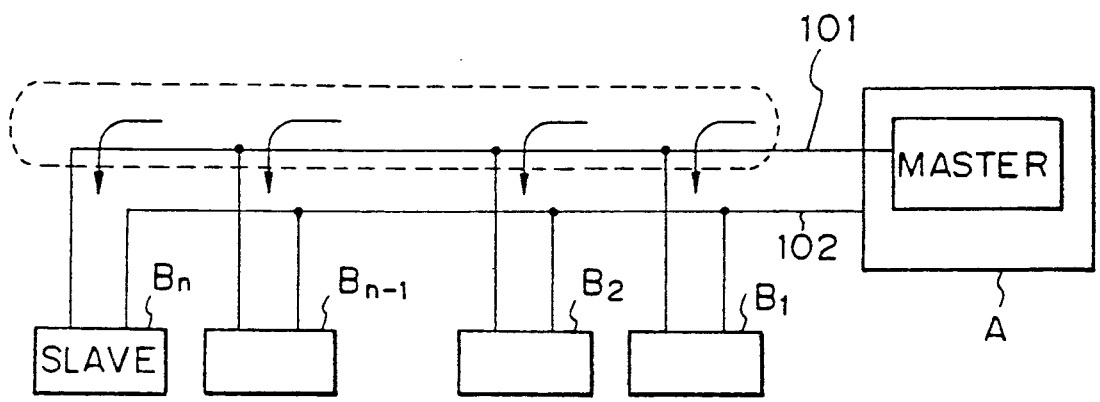
FIG. 1 is a block diagram of an arrangement of a communication system containing a master station and a plurality of slave stations.
Figure 2:
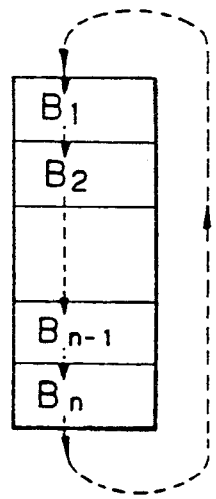
FIG. 2 shows an example of a polling table.
Figure 11:
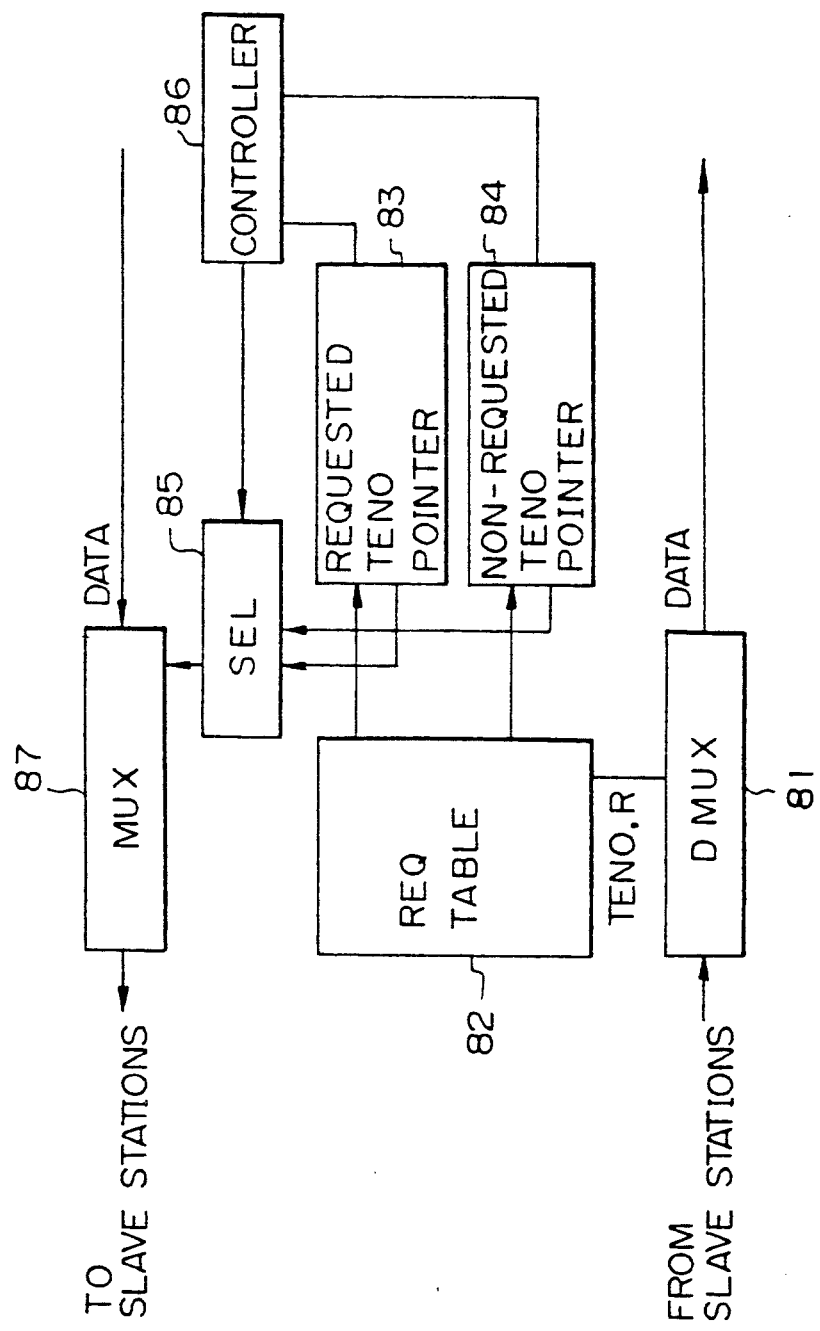
FIG. 11 is a block diagram illustrating the construction of a master station in the second embodiment of the present invention.

FIG. 11 shows the construction of a master station in the second embodiment of the present invention. In the second embodiment, the overall arrangement of the system is as shown in FIG. 1, the construction and the operation of the slave stations are as shown in FIGS. 3 and 5, and the text formats transmitted between the master station and the slave stations are as shown in FIGS. 4A and 4B.

In FIG. 11, reference numeral 81 denotes a demultiplexer, 82 denotes a request table, 83 denotes a requested TENO pointer, 84 denotes a non-requested TENO pointer, 85 denotes a selector, 86 denotes a controller, and 87 denotes a multiplexer.

In the construction of FIG. 11, a data signal of the format of FIG. 4B from a slave station is divided into a request bit R, a terminal number TENO of the slave station, and data portion in the demultiplexer 81. The data portion is transferred to a portion where the data is processed (not shown).

The request table 82 has addresses corresponding to the plurality of slave stations in the system. The above terminal number TENO from the demultiplexer 81 is applied to the request table as an address signal, and the above request bit R is written in the address of the request table.

The requested TENO pointer 83 holds one of the addresses of the request table 82 in which request bits "1" are written. The content of the requested TENO pointer 83 is renewed by the controller 86 to a next one of the addresses of the request table 82 in which addresses "1" request bits are written, in a cyclic order.

The non-requested TENO pointer 84 holds one of the addresses of the request table 82 in which addresses "0" request bits are written. The content of the non-requested TENO pointer 84 is renewed by the controller 86 to a next one of the addresses of the request table 82 in which addresses request bits "0" are written, in a cyclic order.

Both the outputs of the requested TENO pointer 83 and the non-requested TENO pointer 84 are applied to the selector 85. The controller 86 controls the selector 85 to select the output of the requested TENO pointer 83 when at least one "1" bit is held in the request table 82, or the controller 86 controls the selector 85 to select the output of the non-requested TENO pointer 84 when no "1" bit is held in the request table 82. The selected output (terminal number TENO) of the selector 85 is supplied to the multiplexer 87 as a polling address.

Figure 12:
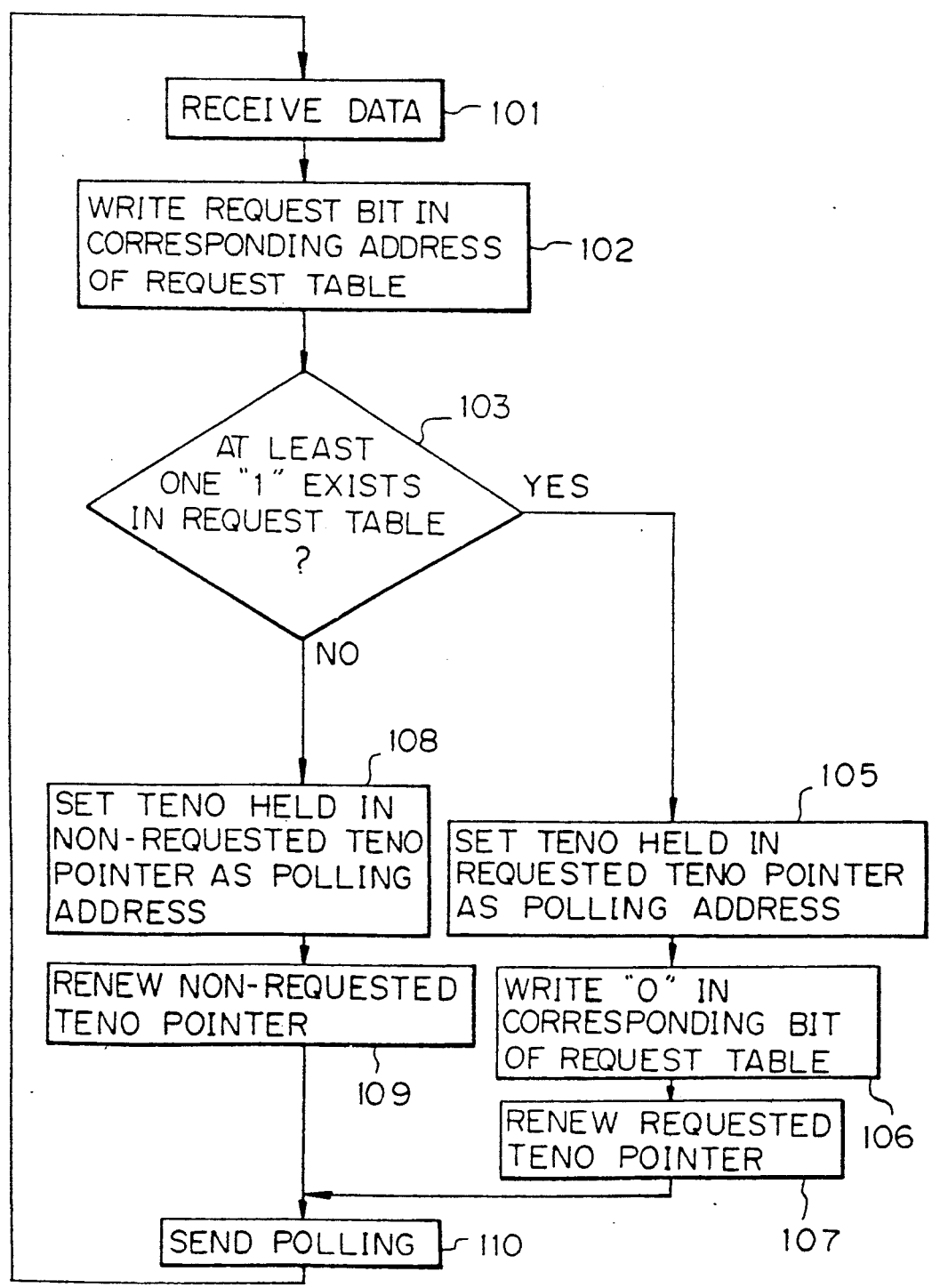
FIG. 12 is a flowchart illustrating operation of the master station shown in FIG. 11.

All the above operations in the master station are controlled by the controller 86, and the control flow of the controller 86 is shown in FIG. 12.

When a data signal is received in the step 101, the request bit contained in the received data signal is written in the request table 82 at the address which is equal to the terminal number TENO, in the step 102. In the step 103, it is determined whether or not at least one "1" bit is held in the request table 82. If it is determined that at least one "1" bit is held in the request table 82, the operation goes to the step 105, or if it is determined that no "1" bit is held in the request table 82, the operation goes to the step 108.

In the step 105, the terminal number TENO held in the requested TENO pointer 83 is selected as a polling address. Then, in the step 106, a "0" bit is written in the above address of the request table 82 which address is held in the requested TENO pointer 83, and the content of the requested TENO pointer 83 is renewed to a next one of the addresses (terminal number TENO) of the request table 82, in which addresses "1" bits are written, in the step 107.

In the step 108, the terminal number TENO held in the non-requested TENO pointer 84 is selected as a polling address. Then, the content of the non-requested TENO pointer 84 is renewed to a next one of the addresses (terminal number TENO) of the request table 82, in which addresses "0" bits are written, in the step 109.

The polling signal containing the terminal number TENO selected as above is sent to the slave stations in the step 110.

Figure 13:
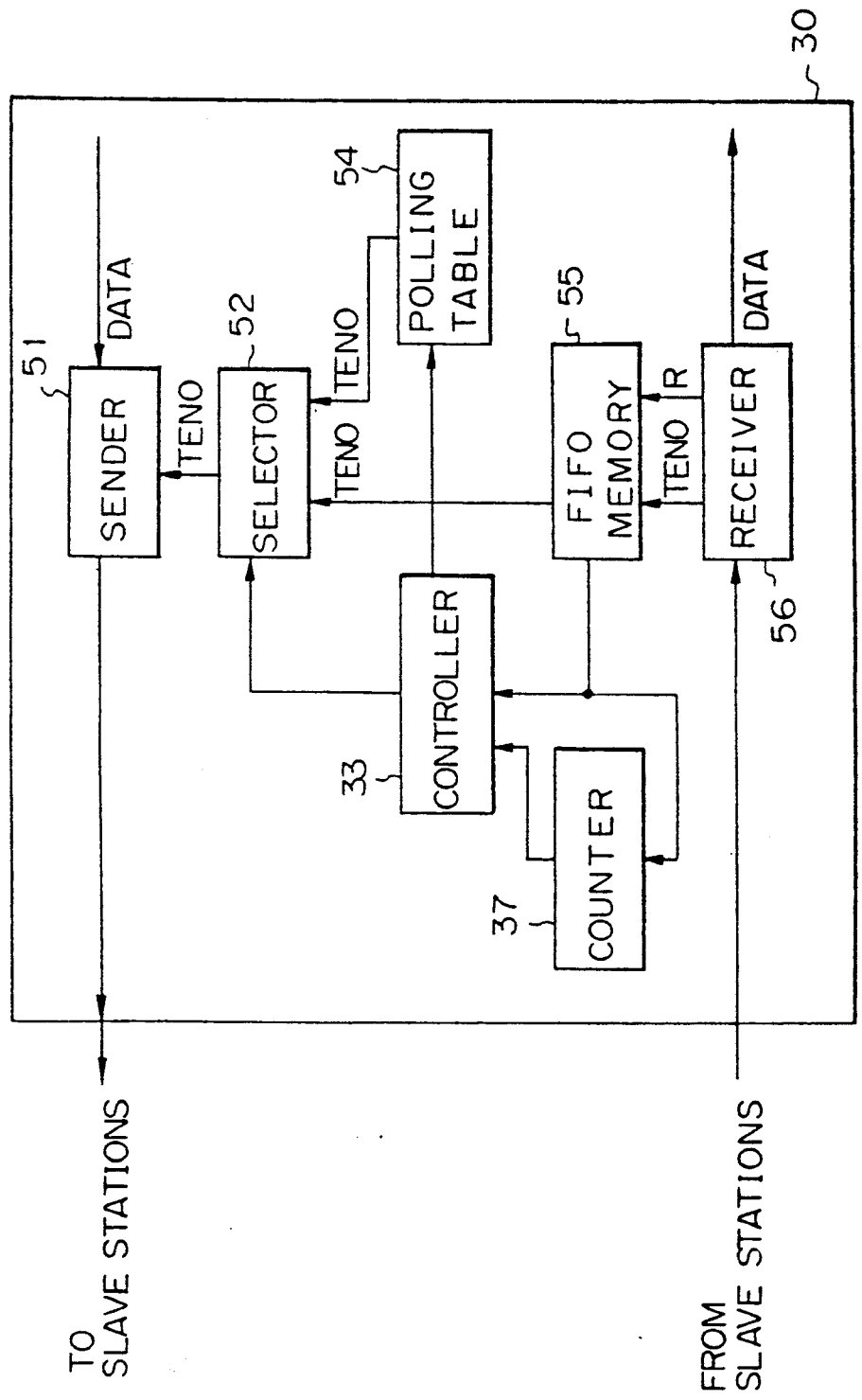
FIG. 13 is a block diagram illustrating the construction of a master station in the third embodiment of the present invention.

FIG. 13 shows the construction of a master station in the third embodiment of the present invention. In the third embodiment, the overall arrangement of the system are as shown in FIG. 1, the construction and the operation of the slave stations are as shown in FIGS. 3 and 5, and the text formats transmitted between the master station and the slave stations are as shown in FIGS. 4A and 4B.

In the construction of FIG. 13, a counter 37 is provided in the master station in addition to the construction similar to the construction of FIG. 6.

The counter 37 counts the number of successive cycles in which read-out operations in the FIFO memory 55 are carried out, i.e., the counter 37 counts the number of successive selections of the outputs of the FIFO memory 55. A ripple carry signal from the counter 37 is supplied to the controller 33 and the count is reset when the count becomes equal to a predetermined number.

The controller 33 carries out the same operation as in the construction of FIG. 6 until the count in the counter 37 becomes equal to the above predetermined number. When the count becomes equal to the predetermined number, the controller 33 renews the output of the polling table 54, controls the selector 52 to select the output of the polling table 54 instead of the output of the FIFO memory 55, and stops a read-out operation in the FIFO memory 55.

By the above construction of FIG. 13, the polling is prevented from being carried out successively over the predetermined number of times by one slave station, i.e., extensive exclusive use of the communication system by one slave station is prevented.

Figure 14:
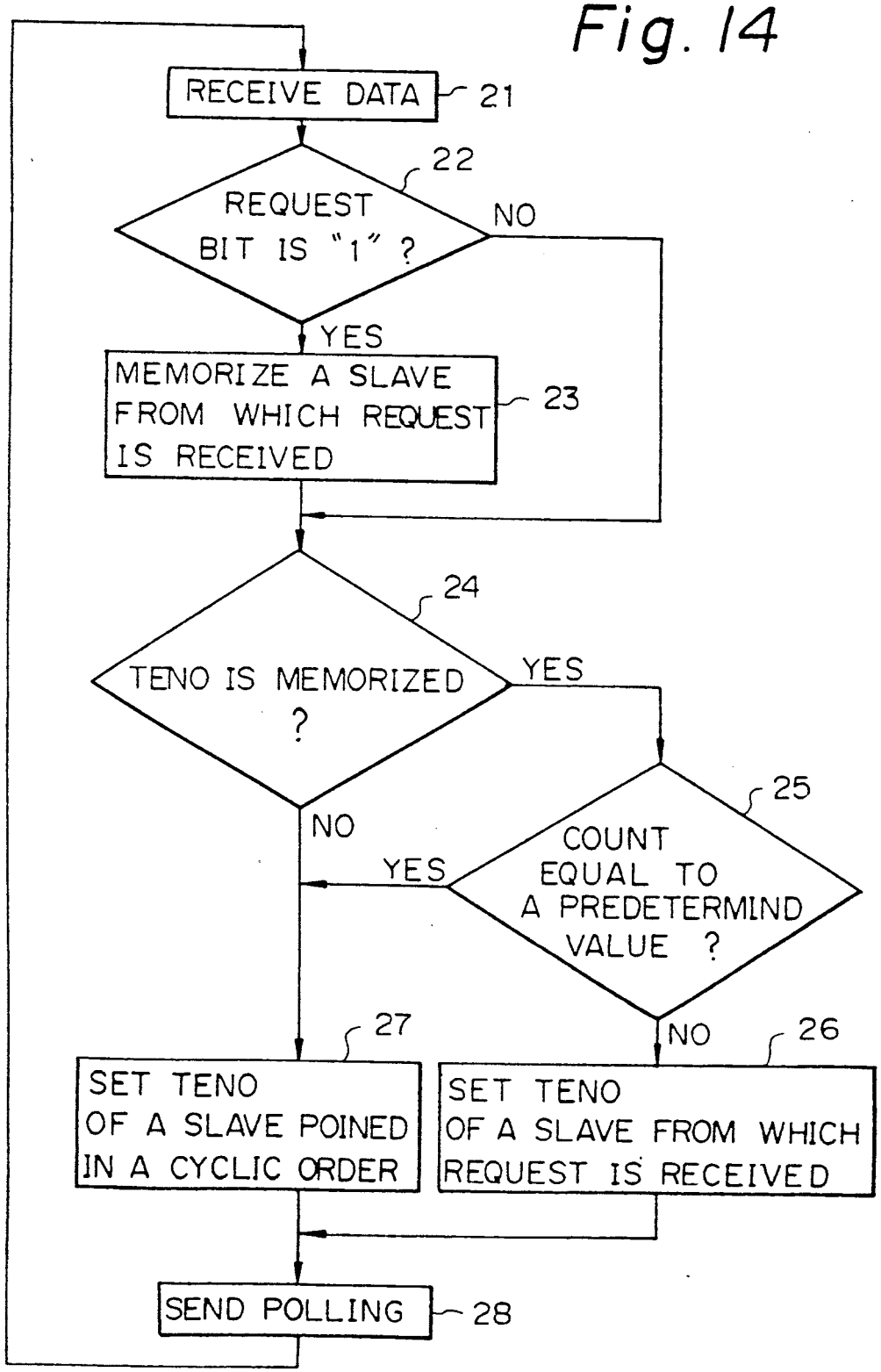
FIG. 14 is a flowchart illustrating operation of the master station shown in FIG. 13.

FIG. 14 shows the control operation of the controller 33 in the construction of FIG. 13.

The only difference between the operation of FIG. 14 and FIG. 7 is that the operation of FIG. 14 is provided with a step 25 between the steps 24 and 26.

In the operation of FIG. 14, if it is determined that a terminal number TENO is memorized in the FIFO memory 55 in the step 24, then it is determined whether or not the count in the counter 37 is equal to the predetermined number in the step 25. If it is determined that the count in the counter 37 is equal to the predetermined number, the operation goes to the step 27 instead of to the step 26. Or if it is determined that the count in the counter 37 is not equal to the predetermined number, the operation goes to the step 26 as in the operation of FIG. 7.

Figure 15:
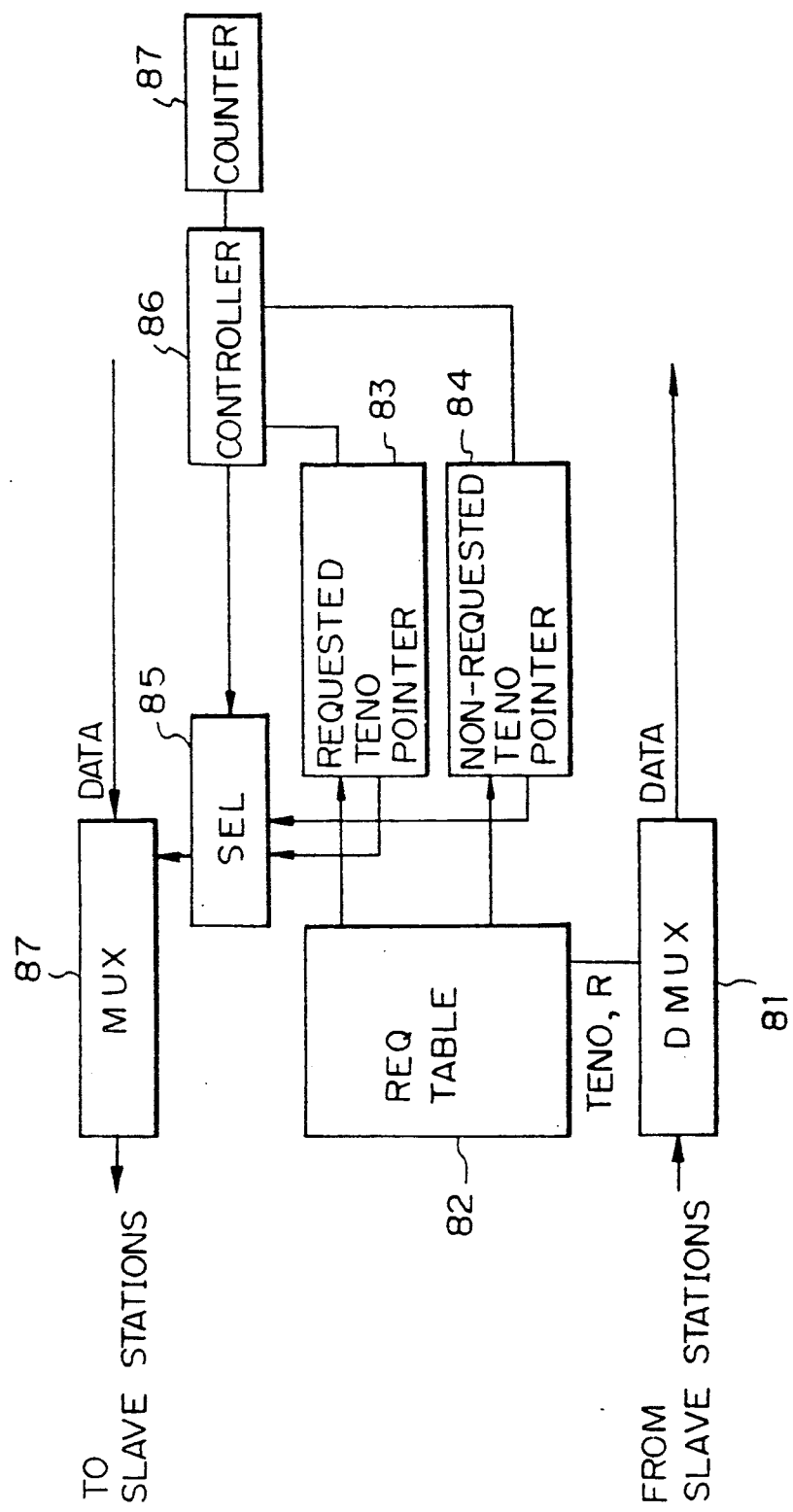
FIG. 15 is a block diagram illustrating the construction of a master station in the fourth embodiment of the present invention.

FIG. 15 shows the construction of a master station in the fourth embodiment of the present invention. In the fourth embodiment, the overall arrangement of the system is as shown in FIG. 1, the construction and the operation of the slave stations are as shown in FIGS. 3 and 5, and the text formats transmitted between the master station and the slave stations are as shown in FIGS. 4A and 4B.

In the construction of FIG. 15, a counter 87 is provided in addition to the construction similar to the construction of FIG. 11.

The counter 87 counts a number of successive outputs of allowances to communicate with the master station, which have been given to the slave stations which are pointed to by the requested TENO pointer 83. A ripple carry signal from the counter 87 is supplied to the controller 33 and the counter 87 is reset when the number becomes equal to a predetermined number.

The controller 86 carries out the same operation as in the construction of FIG. 11 until the count in the counter 86 becomes equal to the predetermined number. When the count becomes equal to the predetermined number, the controller 86 renews the non-requested TENO pointer 84, and controls the selector 85 to select the output of the non-requested TENO pointer 84.

By the above construction of FIG. 15, the polling is prevented from being carried out successively over the predetermined number of times by slave stations from which requests have already been received in the master station, i.e., an exclusive use of the communication system by slave stations from which requests have already been received in the master station, is prevented.

Figure 16:
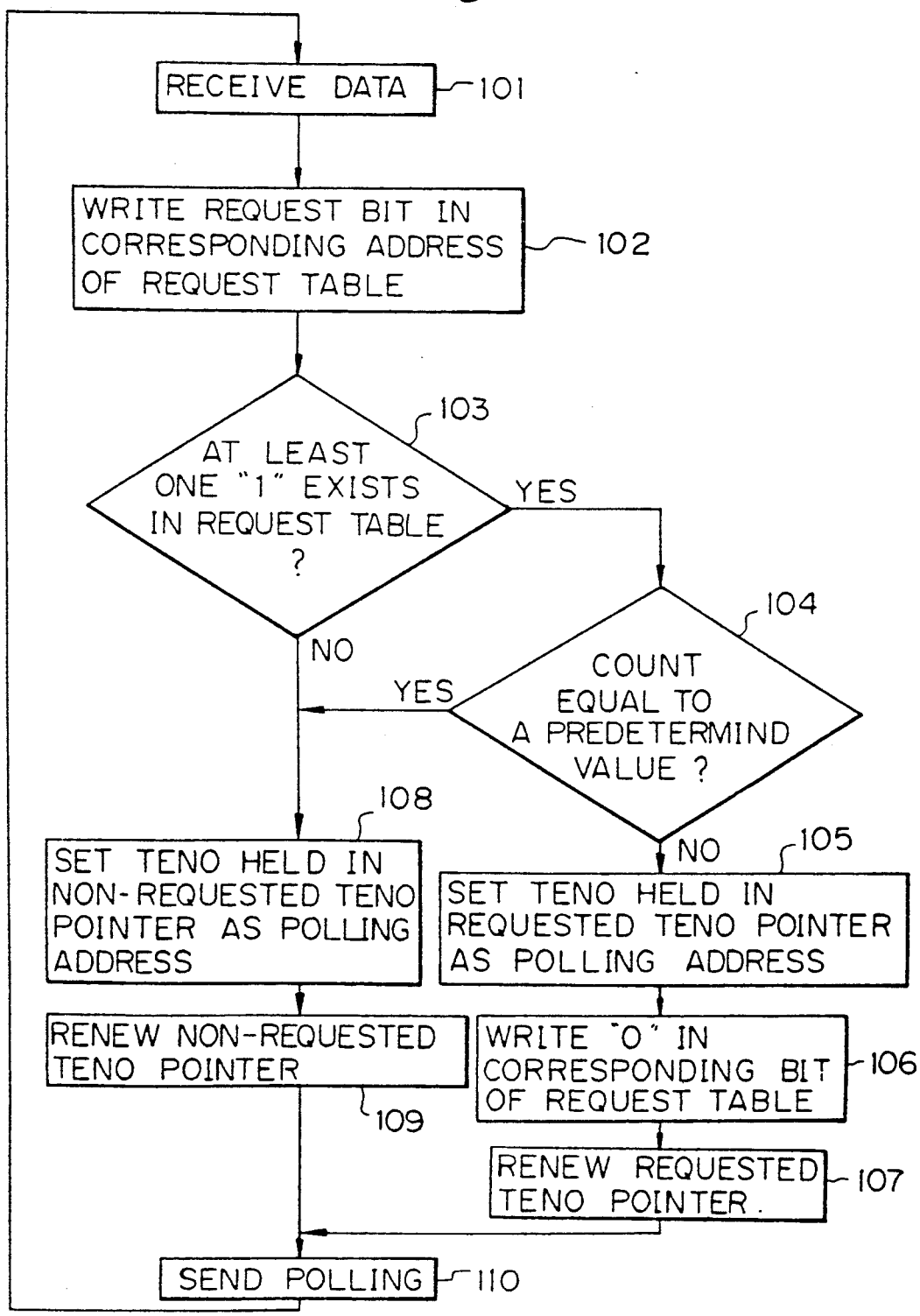
FIG. 16 is a flowchart illustrating operation of the master station shown in FIG. 15.

FIG. 16 shows the control operation of the controller 86 in the construction of FIG. 15.

The only difference between the operation of FIG. 16 and FIG. 12 is that the operation of FIG. 16 is provided with a step 104 between the steps 103 and 105.

In the operation of FIG. 16, if it is determined that at least one "1" bit is held in the request table 82 in the step 103, then it is determined whether or not the count in the counter 87 is equal to the predetermined number in the step 114. If it is determined that the count in the counter 87 is equal to the predetermined number, the operation goes to the step 108 instead of to the step 105. On the other hand, if it is determined that the count in the counter 87 is not equal to the predetermined number, the operation goes to the step 105 as in the operation of FIG. 12.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A communication system, comprising:
   a master station,
   a plurality of slave stations each for communicating corresponding data with said master station; and
   a two-way transmission line connecting said master station and said plurality of slave stations;
   each of said slave stations includes at least
      request sending means for sending a request for further communication with said master station appended to the corresponding data sent to said master station when said slave station corresponding thereto receives an allowance signal from said master station and said slave station corresponding thereto has the request for further communication;
      transmitting means for sending the corresponding data upon reception of the allowance signal; said master station includes at least:
      request detecting means for detecting the request for further communication with said master station which is appended to the corresponding data sent from one of said slave stations;

request memorizing means for memorizing one of said slave stations from which the request for further communication with said master station is detected, until the allowance signal is sent from said master station to the one of said slave stations corresponding to the memorizing of the one of said slave stations;

cyclic address pointing means for pointing out an address of a next one of said plurality of slave stations in a cyclic order when no slave station is memorized in said request memorizing means; and select control means for outputting the allowance signal to communicate with said master station either to one of said slave stations read out from said request memorizing means when at least one of said slave stations are memorized in said request memorizing means, or to one of said slave stations the address of which is pointed out by said cyclic address pointing means when no slave station is memorized in said request memorizing means.

2. A communication system according to claim 1, wherein said select control means outputs the allowance signal to communicate with said master station to one of said slave stations read out from said request memorizing means in the order the request is received by said master station when at least one slave station is memorized in said request memorizing means.

3. A communication system according to claim 1, wherein each of said slave stations further comprises self address detecting means for detecting the address of said slave station corresponding thereto in a signal received from said master station.

4. A communication system according to claim 3, wherein said request sending means comprises:

request bit generating means for generating a request bit indicating whether said slave station corresponding thereto has the request for further communication with said master station; and sending means for sending the request bit, the address of said slave station corresponding thereto, and the data to be sent to said master station, when the address of said slave station corresponding thereto detected in said self address detecting means.

5. A communication system, comprising:
a master station;
a plurality of slave stations each for communicating corresponding data with said master station; and
a two-way transmission line connecting said master station and said plurality of slave stations;
each of said slave stations includes at least request sending means for sending a request for further communication with said master station appended to the corresponding data sent to said master station when said slave station corresponding thereto receives an allowance signal from said master station and said slave station corresponding thereto has the request for further communication;

transmitting means for sending the corresponding data upon reception of the allowance signal; said master station includes at least:

request detecting means for detecting the request for further communication with said master station which is appended to the corresponding data sent from one of said slave stations;

request memorizing means memorizing one of said slave stations from which the request for further communication with said master station is detected, until the allowance signal is sent from said master station to one of said slave stations corresponding to the memorizing of one of said slave stations;

counter means for counting a count number of successive cycles in which read-out operations of said slave stations from said request memorizing means are carried out, and for resetting the count number when the count number becomes equal to a predetermined number;

cyclic address pointing means for pointing out an address of a next one of said plurality of slave stations in a cyclic order either when no slave station is memorized in said request memorizing means, or when the number counted by said counter means becomes equal to the predetermined number;

select control means for outputting the allowance signal to communicate with said master station to one of said slave stations read out from said request memorizing means when at least one of said slave stations are memorized in said request memorizing means and the count number in said counter means is not equal to the predetermined number, and for outputting the allowance signal to communicate with said master station to one of said slave stations the address of which is pointed out by said cyclic address pointing means either when no slave station is memorized in said request memorizing means, or when the count number in said counter means is equal to the predetermined number.

6. A communication system according to claim 5, wherein said select control means outputs the allowance signal to communicate with said master station to one of said slave stations read out from said request memorizing means in the order the request is received by said master station when at least one slave station is memorized in said request memorizing means.

7. A communication system according to claim 5, wherein each of said slave stations further comprises self address detecting means for detecting the address of said slave station corresponding thereto in a signal received from said master station.

8. A communication system according to claim 7, wherein said request sending means comprises:

request bit generating means for generating a request bit indicating whether said slave station corresponding thereto has the request for further communication with said master station; and sending means for sending the request bit, the address of said slave station corresponding thereto, and the data to be sent to said master station, when the address of said slave station corresponding thereto is detected in said self address detecting means.

9. A communication system, comprising:
a master station;
a plurality of slave stations each for communicating corresponding data with said master station; and
a two-way transmission line connecting said master station and said plurality of slave stations; each of said slave stations includes at least request sending means for sending a request for further communication with said master station appended to the corresponding data sent to the master station when said slave station corresponding thereto receives an allowance signal from said master station and said slave station corresponding thereto has the request for further communication;

transmitting means for sending the corresponding data upon reception of the allowance signal; said master station includes at least:

request detecting means for detecting the request for further communication with said master station which is appended to the corresponding data sent from one said slave stations request memorizing means for memorizing one of said slave stations from which the request for further communication with said master station is detected, until the allowance signal is sent to one of said slave stations corresponding to the memorizing on the one of said slave stations from said master station;

requesting address pointing means for pointing out one of the addresses of said slave stations memorized in said request memorizing means in a first predetermined order;

non-requested address pointing means for pointing out one of the addresses of said slave stations not memorized in said request memorizing means in a second predetermined order; and select control means for outputting the allowance signal to communicate with said master station either to one of said slave stations the address of which is pointed out by said requested address pointing means when at least one slave station is memorized in said request memorizing means, or to one said slave stations the address of which is pointed out by said non-requested address pointing means when no slave station is memorized in said request memorizing means.

10. A communication system according to claim 9, wherein each of said slave stations further comprises self address detecting means for detecting the address of said slave station corresponding thereto in a signal received from said master station.

11. A communication system according to claim 10, wherein said request sending means comprises:

request bit generating means for generating a request bit indicating whether said slave station corresponding thereto has the request for further communication with said master station; and sending means for sending the request bit, the address of said slave station corresponding thereto, and the data to be sent to said master station, when the address of said slave station corresponding thereto is detected in said self address detecting means.

12. A communication system according to claim 9, wherein the first and second predetermined orders each have a cyclic order.

13. A communication system, comprising:
a master station;
a plurality of slave stations each for communicating corresponding data with said master station; and
a two-way transmission line connecting said master station and said plurality of slave stations;
each of said slave stations includes at least
request sending means for sending a request for further communication with said master station appended to the corresponding data sent to the master station when said slave station corresponding thereto receives an allowance signal from said master station and said slave station corresponding thereto has the request for further communication;

transmitting means for sending the corresponding data upon reception of the allowance signal; said master station includes at least request detecting means for detecting the request for further communication with said master station which is appended to the corresponding data sent from on of said slave stations;

request memorizing means for memorizing one of said slave stations from which the request for further communication with said master station is detected, until the allowance signal is sent from said master station to one of said slave stations corresponding to the memorizing of the one of said slave stations;

counter means for counting a count number of successive outputs of allowances to communicate with said master station which have been given to said slave station memorized in said request memorizing means, and for resetting the count number when the count number becomes equal to a predetermined number;

requested address pointing means for pointing out one of the addresses of said slave stations memorized in said request memorizing means in a first predetermined order;

non-requested address pointing means for pointing out one of the addresses of said slave stations not memorized in said request memorizing means in a second predetermined order; and select control means for outputting the allowance signal to communicate with said master station to one of said slave stations the address of which is pointed out by said requested address pointing means when at least one slave station is memorized in said request memorizing means and the count number in said counter means is not equal to the predetermined number, and for outputting the allowance signal to communicate with said master station to one said slave stations the address of which is pointed out by said non-requested address pointing means when no slave station is memorized in said request memorizing means, or when the count number in said counter means is equal to the predetermined number.

14. A communication system according to claim 13, wherein each of said slave stations further comprises self address detecting means for detecting the address of said slave station corresponding thereto in a signal received from said master station.

15. A communication system according to claim 14, wherein said request sending means comprises:

request bit generating means for generating a request bit indicating whether said slave station corresponding thereto has the request for further communication with said master station; and sending means for sending the request bit, the address of said slave station corresponding thereto, and the data to be sent to said master station, when the address of said slave station corresponding thereto is detected in said self address detecting means.

16. A communication system according to claim 13, wherein the first and second predetermined orders each have a cyclic order.

* * * * *

UNITED STATES PATENT AND TRADEMARK OFFICE
CERTIFICATE OF CORRECTION

PATENT NO. : 5,132,680

DATED : July 21, 1992

INVENTOR(S) : Tezuka et al.

It is certified that error appears in the above-identified patent and that said Letters Patent is hereby corrected as shown below:

Col. 1, line 34, delete "to";
line 40, after "station" insert --.--.

Col. 3, line 20, delete "an".

Col. 13, line 20, "on" should be --of--;
line 22, "requesting" should be --requested--;
line 36, after "one" insert --of--.

Signed and Sealed this

Twenty-first Day of September, 1993

Attest:

BRUCE LEHMAN

Attesting Officer

Commissioner of Patents and Trademarks